Dec. 21, 1948.  M. A. ADAMS  2,456,665
ARTIFICIAL BAIT
Filed March 25, 1947
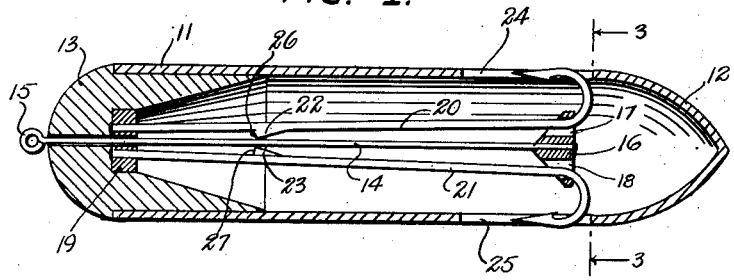
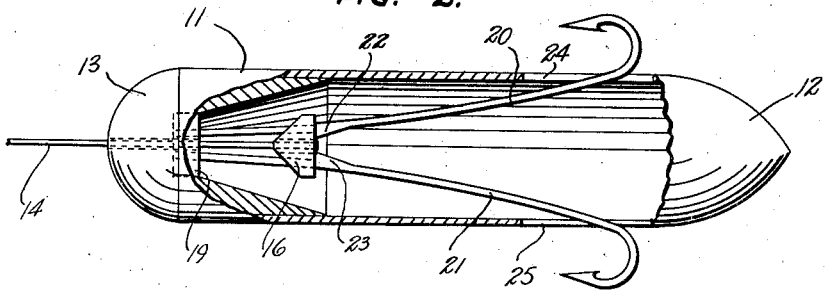
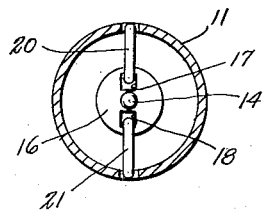 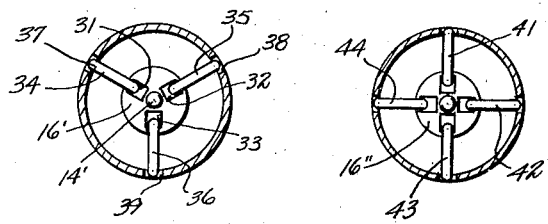
Inventor:
MOZEL A. ADAMS,
By McMorrow, Berman & Davidson
Attorneys.

Patented Dec. 21, 1948

2,456,665

UNITED STATES PATENT OFFICE 2,456,665

ARTIFICIAL BAIT

Mozel A. Adams, Evangeline, La.

Application March 25, 1947, Serial No. 736,927

3 Claims. (Cl. 43—37)

This invention relates to artificial fishing bait, and more particularly to a fishing bait device of the expanding hook type.

A main object of the invention to to provide a novel and improved fishing bait device wherein the hook portions are normally held in retracted positions so that the device will not become entangled in weeds, said device being arranged so that the hook portions are projected responsive to a pull on the device, as when a fish strikes the lure, the device being very simple in construction and reliable in operation.

A further object of the invention is to provide an improved fishing bait device which is inexpensive to manufacture, easy to use and compact in construction.

Further objects and advantages of the invention will become apparent from the following description and claims, and from the accompanying drawings, wherein:

Figure 1 is a longitudinal cross-sectional view taken through a bait device constructed in accordance with the present invention, the hook portions thereof being shown in normal retracted positions.

Figure 2 is an elevational view, partly in cross-section, of the bait device of Figure 1, showing the hook portions in projecting positions.

Figure 3 is a transverse cross-sectional view taken on line 3—3 of Figure 1.

Figure 4 is a cross-sectional view similar to Figure 3 but showing a modification of the bait device of Figure 1.

Figure 5 is a cross-sectional view similar to Figure 3 but showing a still further modification of the bait device.

Referring to the drawings, 11 designates a generally cylindrical hollow casing formed at its rear end with a curved tapered nose portion 12. Secured in the forward end of casing 11 is a hollow plug member 13 and axially slidable in said plug member is a rod element 14 provided at its forward end with an eye 15 for attachment to a fishing line. Rod element 14 extends to the rear portion of housing 11 and carries on its rear end a block member 16.

Member 16 is formed with a pair of radial slots 17 and 18 which are diametrically opposed. Secured in housing 11 by an anchor element 19 which is rigidly held in the forward end portion of the cavity in plug member 13 are a pair of divergent resilient hooks 20 and 21. Hook 20 is substantially coplanar with and passes through slot 17, and hook 21 is likewise substantially coplanar with and passes through slot 18. Hook 20 carries a triangular lug element 22 at its forward portion facing inwardly toward rod element 14, and hook 21 carries a similar inwardly facing triangular lug element 23 opposite lug element 22. The lug elements 22 and 23 are adapted to pass through the respective slots 17 and 18 when the block member 16 is drawn forwardly with respect to housing 11. Said housing is formed with a pair of slots 24 and 25 in which the barbed ends of hooks 20 and 21 are normally positioned and through which said ends are projected when a pull is exerted on housing 11, as will be subsequently described.

When a fish strikes the lure, housing 11 is pulled rearwardly with respect to rod element 14, said rod element being held substantially stationary by the fishing line. As the divergent hooks 20 and 21 move rearwardly, lug elements 22 and 23 slide past the inner ends of the respective slots 17 and 18 in block member 16 and engage the rear surface of the center portion of the block member at their forward faces 26 and 27. This action forces the barbed ends of resilient hooks 20 and 21 out through the respective slots 24 and 25 and locks them in projected positions, as shown in Figure 2. The fish is thus caught by becoming entangled with said barbed ends.

To return the hooks to normal positions, rod member 14 is pulled forwardly a short distance beyond the position shown in Figure 2, whereupon the triangular lugs 22, 23 are released from engagement with the block member 16 and the ends of the hooks are allowed to move inwardly while the rod member is moved rearwardly to restore the hooks to their retracted positions shown in Figure 1. Since the hooks are biased inwardly to their normal positions, it is necessary to spread the hooks slightly to permit the triangular lugs 22 and 23 to pass through the slots 17 and 18 at the beginning of the rearward resetting movement of the block member 16.

Figure 4 illustrates a modification of the invention wherein the block member 16' at the end of the rod element 14' is formed with three radial slots 31, 32, and 33 spaced 120 degrees apart, and three correspondingly spaced divergent hooks 34, 35, and 36 pass through the respective slots. The housing is slotted at 37, 38 and 39 to allow the respective hooks 34, 35 and 36 to be projected outwardly responsive to a pull on the housing. Locking means similar to the triangular lug elements 22 and 23 are provided on each of the hooks to lock said hooks in projected positions.

Figure 5 illustrates a further modification in which four equally spaced hooks 41, 42, 43 and 44 are employed, each hook passing through an aligned radial slot in the block member 16" and being provided with locking means similar to the triangular lugs 22 and 23 employed in the modification of Figures 1 to 3. Except for the different number of hooks employed, the operation of the embodiments shown in Figures 4 and 5 is the same as that of the embodiment of Figures 1 to 3.

While certain specific embodiments of a fishing lure device have been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. A fishing lure comprising a hollow casing, a plurality of resilient hook members secured in the forward portion of the casing and extending rearwardly therein, a rod member slidably mounted in the forward portion of the casing and substantially centrally disposed with respect to the hook members, a block member carried on the rear portion of the rod member and adapted to engage the hook members, the wall of the casing being open adjacent the rear portions of the hook members, said hook members being formed and arranged with respect to said block member so that the rear portions of the hook members are projected outside the casing responsive to forward movement of said block member, and locking means on said hook members cooperating with said block member to lock the hook members in projected positions.

2. A fishing lure comprising a hollow casing, a plurality of resilient hook members secured in the forward portion of the casing and extending rearwardly therein, a rod member slidably mounted in the forward portion of the casing and substantially centrally disposed with respect to the hook members, a block member carried on the rear portion of the rod member, said block member being formed with radial slots through which the hook members extend, the wall of the casing being open adjacent the rear portions of the hook members, said hook members being formed and arranged with respect to said block member so that the rear portions of the hook members are projected outside the casing responsive to forward movement of said block member, and an inwardly projecting triangular lug carried by each hook member at a forward portion thereof adapted to cooperate with said block member to lock the hook member in projected position.

3. A fishing lure comprising a hollow casing, a plurality of divergent resilient hook members secured in the forward portion of the casing and extending rearwardly therein, a rod member slidably mounted in the forward portion of the casing and substantially centered with respect to the hook members, a block member carried on the rear portion of the rod member, said block member being formed with radial slots through which the hook members extend, the wall of the casing being open adjacent the rear portions of the hook members whereby said rear portions may be projected outside the casing responsive to forward movement of said block member, and locking means carried by the hook members cooperating with the block member to lock the hook members in projected positions.

MOZEL A. ADAMS.

REFERENCES CITED

The following references are of record in the file of this patent:

UNITED STATES PATENTS

| Number | Name | Date |
| --- | --- | --- |
| 2,204,278 | Lockridge | June 11, 1940 |
| 2,229,259 | Sherwood | Jan. 21, 1941 |
| 2,256,088 | Hogan | Sept. 16, 1941 |
| 2,439,391 | Jobson | Apr. 13, 1948 |